United States Patent

Malm

[15] 3,671,871

[45] June 20, 1972

[54] SIGNAL FREQUENCY SYNTHESIZER

[72] Inventor: Robert E. Malm, Los Angeles, Calif.

[73] Assignee: Northrop Corporation, Los Angeles, Calif.

[22] Filed: Dec. 14, 1970

[21] Appl. No.: 97,576

[52] U.S. Cl. ..................................328/25, 328/14, 328/166, 328/167, 328/22

[51] Int. Cl. ..........................................................H03b 19/00

[58] Field of Search ..................328/14, 21, 166, 22, 25, 167; 307/262

[56] References Cited

UNITED STATES PATENTS

| | | | |
|---|---|---|---|
| 3,293,561 | 12/1966 | Hegarty et al. | 328/14 X |
| 3,464,018 | 8/1969 | Cliff | 328/14 X |
| 3,473,129 | 10/1969 | Tschannen | 307/262 X |
| 3,544,906 | 12/1970 | Dulaney et al. | 328/14 |
| 3,568,069 | 3/1971 | Gabor | 328/14 |
| 3,579,117 | 5/1971 | Norris et al. | 328/14 X |

*Primary Examiner*—John S. Heyman
*Attorney*—Sokolski & Wohlgemuth and W. M. Graham

[57] ABSTRACT

A plurality of binary related anti-coincident pulse trains which are precisely related in frequency and phase to a reference frequency are generated in a binary rate multiplier. The rate multiplier includes gating and control circuitry whereby predetermined combinations of these pulse trains are selectively summed together to provide various output frequencies. The output of the binary rate multiplier, which comprises square wave signals having a predetermined frequency relative to the reference signal frequency, are divided to minimize the effects of irregularities in the frequency of the multiplier output and to provide square waves having substantially uniform periods. These square waves are then appropriately gated and filtered to produce quadrature related sine waves.

4 Claims, 2 Drawing Figures

INVENTOR
ROBERT E. MALM
BY
SOKOLSKI & WOHLGEMUTH
ATTORNEYS

INVENTOR
ROBERT E. MALM

BY

SOKOLSKI & WOHLGEMUTH

ATTORNEYS

SIGNAL FREQUENCY SYNTHESIZER

This invention relates to signal frequency synthesizers and more particularly to such a synthesizer for selectively generating a signal at any one of a plurality of frequencies precisely related to a reference frequency.

There are a number of significant applications where it is necessary to rapidly change the frequency of a signal in the audio or radio frequency range to one of a plurality of predetermined frequencies precisely related to a stable reference frequency. Among such applications are included military radio communications systems, where frequency "-hopping" is utilized for security reasons and to counteract jamming, multiple frequency shift keying, the generation of test signals at precisely related frequencies, etc. In most of these situations, it is essential that the signal frequency be stable and precisely related to the reference frequency. Further, rapid response to the control signal is required if a system is to be effective especially in the aforementioned type of military communications system.

Prior art technique for selectively obtaining one of a plurality of signals precisely related to a reference frequency involves such implementations as the heterodyning of signals, phase locking a submultiple of a voltage controlled oscillator frequency to the reference signal, etc. Most of these prior art systems have a shortcoming of involving relatively complicated circuitry for any significant number of output frequencies. Additionally, such systems generally do not have the capability of as rapid response to a control signal as is required for certain application requirements.

The system of this invention overcomes the shortcomings of prior art frequency synthesizers by utilizing digital techniques whereby the output signals are developed from binary related pulses which can be variously combined in response to a digital control to provide any one of a number of equally spaced frequencies and processed to provide sine and cosine wave outputs. The system of this invention has the advantage of relatively simple circuitry which lends itself to economical construction, such as that of integrated circuitry, is capable of high speed response to digital control circuitry, and furthermore, accomplishes the transition from one frequency to another in a phase-continuous manner.

It is therefore the principal object of this invention to provide an improved system for generating a signal at any one of a plurality of equally spaced frequencies precisely related to a reference frequency, which frequencies can be selectively changed at high speed.

Figure 1:
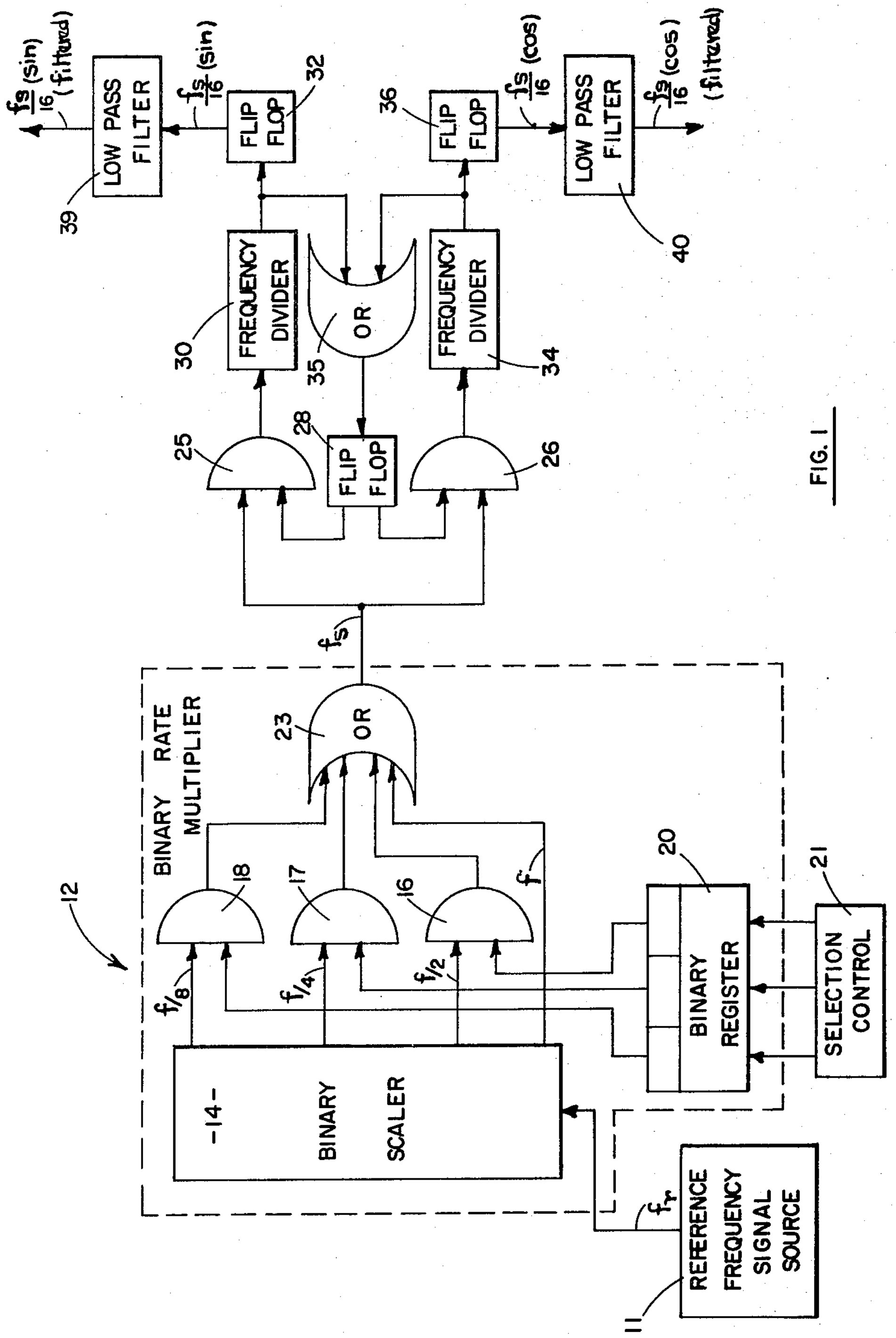
Figure 2:
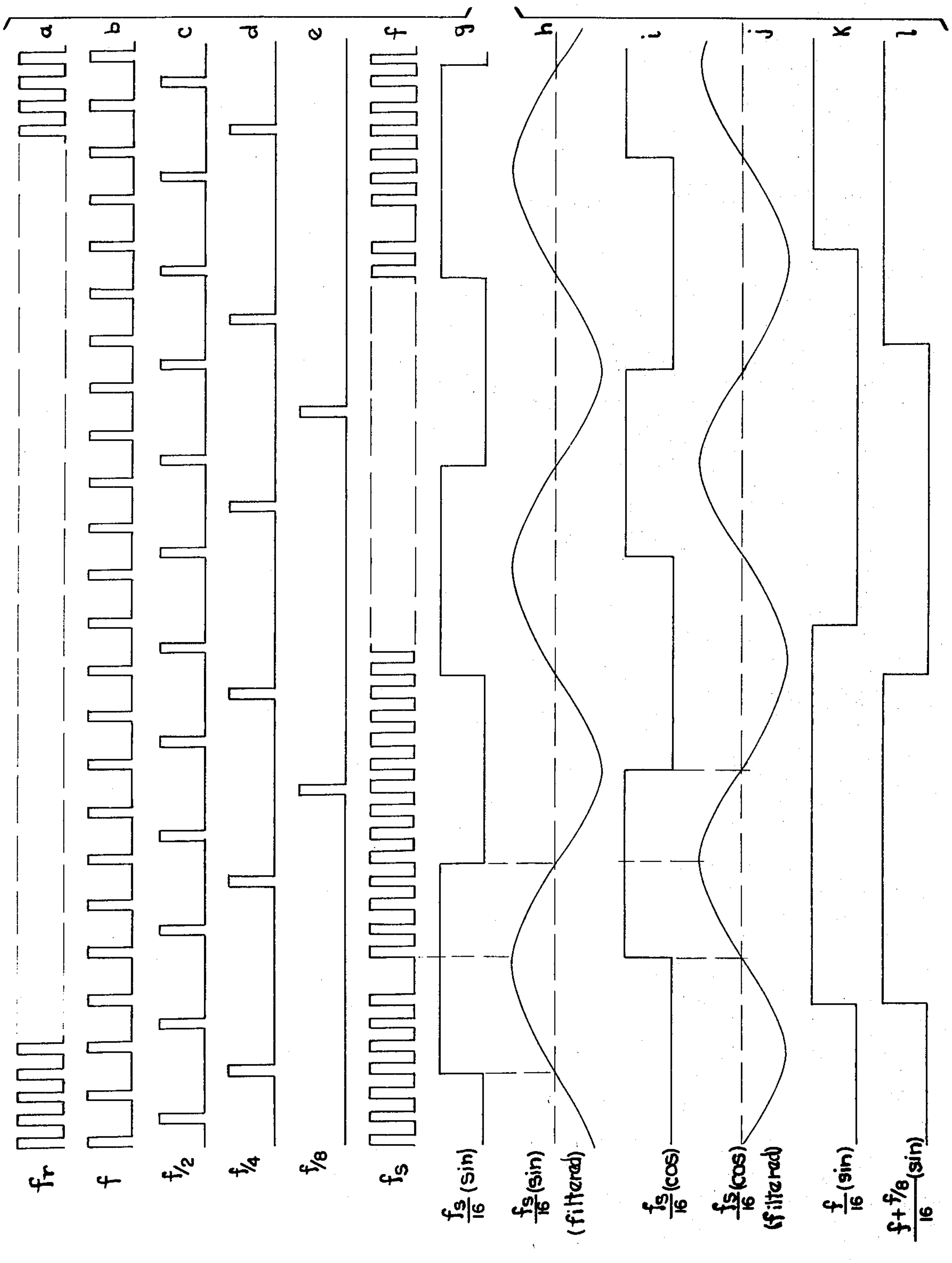

Other object of this invention will become apparent from the following description taken in connection with the accompanying drawings, of which:

FIG. 1 is a functional block diagram of one embodiment of the system of the invention, and FIG. 2 is a series of wave forms illustrating the operation of the embodiment of FIG. 1.

Briefly described, the system of the invention comprises a binary rate multiplier which in response to a reference signal source generates a plurality of binary related anticoincident pulse signals. The binary rate multiplier includes logical gating and control circuitry which enables the selection of various combinations of the binary related pulse trains which are summed to provide a pulse output signal having an average frequency in accordance with the selected combination, this frequency being precisely related to that of the reference signal. The output of the binary rate multiplier is divided by a predetermined number to provide a square wave output having substantially equal positive and negative going period portions. The square wave signal is processed in gating circuitry to provide quadrature related square wave signals which are filtered in low pass filters to produce quadrature related sine waves.

Referring now to FIGS. 1 and 2, one embodiment of the system of the invention is illustrated and wave forms for this embodiment shown. To facilitate the explanation of the operation of the device, the wave forms of FIG. 2 are designated where they appear in the circuits of FIG. 1.

Reference frequency signal source 11, which may include a stable oscillator such as one of the crystal controlled type, operating at a predetermined frequency in the radio or audio frequency range, has an output, $f_r$, which is a square wave as shown in line a of FIG. 2. This signal is fed to binary scaler 14 of binary rate multiplier 12, where the signal is divided in binary fashion and gated so that the binary related output signals, ($f$, $f/2$, $f/4$ and $f/8$) are in anti-coincidence i.e., do not in any instance overlap each other. The relationship of the various signals $f_r$, $f$, $f/2$, $f/4$ and $f/8$ is shown in FIG. 2. As can be seen, $f$ is at half the frequency of $f_r$.

The $f/2$, $f/4$ and $f/8$ outputs of binary scaler 14 are fed to AND gates 16–18 respectively. AND gates 16–18 also each receives a separate output from binary register 20, these binary register outputs providing gating signals to the associated gates in response to selection control 21. Thus, selection control 21, which may be programmed automatically or manually controlled, is utilized to activate any one, none, or any combination of the binary register outputs. With three binary outputs as indicated in the illustrative example of FIG. 1, eight different combinations of outputs can be provided to AND gates 16–18 to provide different combinations of signal frequencies $f/2$, $f/4$, and $f/8$ to OR gate 23.

OR gate 23 also receives signal frequency "$f$" at all times. For the purposes of illustration, the output, "$f_s$" of the OR gate is shown as it would be with all of the stages of binary register 20 activated, i.e., in the "1" state, so that all of the binary scaler output frequencies are present in output $f_s$. It should, however, be readily apparent that seven other frequencies can be synthesized by the selection of various available combinations of binary register control signals. The binary rate multiplier is a circuit well known in the art and therefore need not be described in further detail. A good description of this circuit may be found, for example, on pages 29–05 through 29–08 of *HANDBOOK OF AUTOMATION, COMPUTATION, AND CONTROL, VOL. II* by Arabbe, Ramo and Wooldridge.

The output signal, $f_s$, of the binary rate multiplier as can be seen in line f of FIG. 2 is somewhat irregular in that there are spots therein in which the frequency abruptly changes and further the positive going period portions have a shorter duration than the negative going period portions. These irregularities are smoothed out in the circuitry now to be described. The output signal, $f_s$, is simultaneously fed to AND gates 25 and 26. These AND gates each receives an output from a separate one of the stages of flipflop 28. Let us assume that flipflop 28 is in a state such that the stage connected to AND gate 25 is activated to enable this gate to pass the signal, $f_s$, therethrough to frequency divider 30. Frequency divider 30 divides the signal by a predetermined number which for the illustrative example is 4, the divided signal being utilized to drive flipflop 32. Thus, for the illustrative example, frequency divider 30 has a single pulse output for each four input pulses received from AND gate 25. Thus, flipflop 32 is driven by the fourth input pulse to generate the leading edge of the first positive going period of square wave $f_s/16$, as shown in Line *g* of FIG. 2.

A signal is simultaneously fed from divider 30 through OR gate 35 to drive flipflop 28 to an opposite state whereby AND gate 25 is "inhibited" and gate 26 is "enabled." Thus, succeeding pulses in the pulse train, $f_s$, are passed through AND gate 26 to frequency divider 34 which provides an output to flipflop 36 for every fourth pulse fed thereto. During this time, no pulses are fed through AND gate 25 which remains inhibited. Thus, the leading edge of the $f_s/16$ (cos) signal as shown in Line *i* of FIG. 2 is generated in quadrature relationship with the $f_s/16$ (sin) signal shown in Line *g*. The output of frequency divider 34 is also fed through OR gate 35 and operates to actuate flipflop 28 so as to return the signal fed therefrom to AND gate 25 to a state such as to "enable" the flipflop. After four more pulses in the pulse train $f_s$, an output from frequency divider 30 is produced which drives flipflop 32 to an opposite state resulting in the generation of the trailing edge of the signal $f_s/16$ (sin). The outputs of flipflops 32 and 36 are filtered in low pass filters 39 and 40 respectively and results in the quadrature related sine waves illustrated in lines *h* and *j* of FIG. 2.

It is to be noted that the outputs of flipflops 32 and 36 for the illustrative example are at a frequency which is 1/16 of that of "$f_s$." It is further to be noted that these output signals have a slightly different period for their positive and negative portions, the signal shown in line g of FIG. 2 having a slightly longer positive period portion, while the signal of Line *i* has a slightly longer negative period portion. This small variation in period is tolerable for most practical applications and of course is proportionately reduced a considerable degree as compared with the irregularities appearing in the periods of the signal $f_s$. Lower proportional variations in the periods of the output wave can be obtained by dividing the signal by a greater factor. Dividing by a different factor, of course, also makes for a different frequency range in the output signals.

For illustrative purposes, the square wave output which would be produced by flipflop 32 for the situation where only the signal frequency, "$f$" (Line *b* of FIG. 2) were present in the output of the binary rate multiplier is shown in Line *k* of FIG. 2, while the same flipflop output for the situation where "$f$" and "$f/8$" are simultaneously present is shown in Line 1 of this same figure. As already noted, a different frequency output can be generated for each of the other binary combinations available. For the illustrative embodiment, the frequency range of the signals which can be produced ranges between $f_s/16$ as shown in Line g of FIG. 2, and $f/16$ as shown in Line k of this Figure, $f_s$ being equal to $7/8\, f_r$ and f being equal to $f_r/2$. The low pass filters of course must be designed to pass this range of frequencies.

It should be readily apparent that while the illustrative example as shown includes only four frequency outputs from binary scaler 14 operating in conjunction with a three-stage register 20, that a significantly greater number of binary signals can be combined in the same manner as described herein to afford a significantly greater selection of output frequencies.

The device of this invention thus provides a simple yet highly effective means for providing any one of a plurality of output frequencies which are precisely related to a reference frequency. Thus, an output signal can be shifted from frequency to frequency in response to digital control signals at a relatively rapid rate.

I claim:

1. A signal frequency synthesizer for selectively providing an output signal at any one of a plurality of frequencies, comprising:

a reference signal source, means for generating a plurality of binary related pulse trains which are in anti-coincidence and the frequencies of which have a predetermined fixed relationship with the frequency of said reference signal source, means for selectively adding together any desired combination of said binary related pulse trains, first and second frequency divider means for dividing the frequency of said added pulse trains, means responsive to the outputs of said divider means for alternately gating a number of pulses corresponding to the dividing factor of said divider means from the output of said means for generating binary-related pulse trains to the inputs of each of said divider means in turn, and first and second means responsive to the outputs of said first and second frequency divider means respectively for generating quadrature related square waves in accordance therewith.

2. The signal frequency synthesizer of claim 1 additionally including filter means for filtering the output of said square wave generating means to produce a sine wave.

3. In a signal frequency synthesizer, binary rate multiplier means for generating a pulse train which is a selected combination of binary related pulse trains, a reference frequency signal source for providing a reference signal to said binary rate multiplier means, the binary related pulse trains being fixedly related in frequency to that of said signal source, means for selecting a desired combination of said binary related pulse trains for the output of said binary rate multiplier means, first and second frequency dividers, means responsive to the outputs of said dividers for alternately gating a number of pulses corresponding to the dividing factor of said dividers from the output of said binary rate multiplier means to each of said dividers in turn, associated switching circuit means responsively connected to the output of each of said frequency dividers for generating a pair of quadrature related square wave output signals, and low pass filter means connected to each of said switching circuit means for converting said square waves to sine waves, whereby said sine waves have a frequency which is fixedly related to that of said reference frequency and in accordance with the selected combination of said binary related signals.

4. The synthesizer of claim 3 wherein said gating means comprises an OR gate for receiving the outputs of said dividers, an AND gate interposed between the output of said binary rate multiplier means and each of said frequency dividers and switching means responsive to the output of said OR gate for alternately enabling each of said AND gates in accordance with successive outputs of said dividers.

* * * * *